(12) United States Patent
Katz

(10) Patent No.: US 10,796,090 B2
(45) Date of Patent: Oct. 6, 2020

(54) QUICK LANGUAGE DETECTION WITH LANGUAGE NEUTRAL FUNCTIONALITY

(71) Applicant: SAP FRANCE, Levallois-Perret (FR)

(72) Inventor: Gilles Katz, Paris (FR)

(73) Assignee: SAP France, Levallois-Perret (FR)

( * ) Notice: Subject to any disclaimer, the term of this patent is extended or adjusted under 35 U.S.C. 154(b) by 145 days.

(21) Appl. No.: 16/137,737

(22) Filed: Sep. 21, 2018

(65) Prior Publication Data
US 2020/0097539 A1    Mar. 26, 2020

(51) Int. Cl.
*G06F 40/263* (2020.01)
*G06N 20/00* (2019.01)
*G06F 40/242* (2020.01)

(52) U.S. Cl.
CPC .......... *G06F 40/263* (2020.01); *G06F 40/242* (2020.01); *G06N 20/00* (2019.01)

(58) Field of Classification Search
CPC .................................................... G06F 40/263
See application file for complete search history.

(56) References Cited

U.S. PATENT DOCUMENTS

| | | | |
|---|---|---|---|
| 2006/0025988 A1* | 2/2006 | Xu | G06F 40/263 704/8 |
| 2007/0219777 A1* | 9/2007 | Chu | G06F 40/263 704/9 |
| 2010/0312545 A1* | 12/2010 | Sites | G06F 40/263 704/8 |
| 2016/0283462 A1* | 9/2016 | Galle | G06F 40/263 |
| 2016/0357728 A1* | 12/2016 | Bellegarda | G06F 40/30 |
| 2020/0097539 A1* | 3/2020 | Katz | G06N 20/00 |

OTHER PUBLICATIONS

Benedetto et al., "Language Trees and Zipping," Physical Review Letters, vol. 88, No. 4, Jan. 2002, 5 pages.
Bush, "Language Identification of Tweets Using LZW Compression," 3rd Pacific Northwest Regional NLP Workshop, Apr. 2014, 2 pages.

* cited by examiner

*Primary Examiner* — Samuel G Neway
(74) *Attorney, Agent, or Firm* — Fish & Richardson P.C.

(57) ABSTRACT

Implementations are directed to receiving text data including a string of characters, processing the text data to determine a set of reference scores including two or more reference scores, each reference score being associated with a respective language, and being determined based on the text data and a dictionary document provided for the respective language, each dictionary document including a compression of a language document provided in the respective language, selectively determining a language of the text data based on the set of reference scores, and providing language data representative of the language as output.

17 Claims, 4 Drawing Sheets

QUICK LANGUAGE DETECTION WITH LANGUAGE NEUTRAL FUNCTIONALITY

BACKGROUND

Users (e.g., of computing devices) can interact with automated systems to have one or more functions performed on their behalf (e.g., check on account information, order goods/services). For example, users can call into a call center in an effort to address issues, gather information, and/or use services. Call centers have introduced automated services that enable users to drill-down through menus, for example, in an effort to focus resources to attend to a particular user (e.g., identify a particular department, and/or customer service representative that may be best suited to address the user's needs). Example automated services can include artificial intelligence that processes the user's spoken words to route the call to particular resources. Such automated services, however, can rely on determining a language that the user is interacting in.

Language determination services are available, but have disadvantages. For example, response times for language determination services can be slow, and resource-intensive (e.g., processors, memory). This results in both an inefficient use of resources, as well as a detrimental user experience. Further, accuracy of language determination services can be poor. For example, some language determination services are unrelated to specific contexts. Consequently, accuracy of the identified language can be lower than desired.

SUMMARY

Implementations of the present disclosure are generally directed to language detection. More particularly, implementations of the present disclosure are directed to quick language detection with language neutral functionality.

In some implementations, actions include receiving text data including a string of characters, processing the text data to determine a set of reference scores including two or more reference scores, each reference score being associated with a respective language, and being determined based on the text data and a dictionary document provided for the respective language, each dictionary document including a compression of a language document provided in the respective language, selectively determining a language of the text data based on the set of reference scores, and providing language data representative of the language as output. Other implementations of this aspect include corresponding systems, apparatus, and computer programs, configured to perform the actions of the methods, encoded on computer storage devices.

These and other implementations can each optionally include one or more of the following features: processing the text data to determine the set of reference scores includes, for each dictionary document, determining a number of additions to the dictionary document that would be required to add the text data to the dictionary document based on a state of the dictionary document; each dictionary document is provided based on a compression algorithm, and the state represents a sub-string of characters last processed in the compression algorithm; selectively determining the language of the text data based on the set of reference scores includes determining that the text data is not language neutral, and, in response, processing the reference scores to identify the language; determining that the text data is not language neutral includes processing the set of reference scores, and a length of the text data using a machine-learning (ML) technique that outputs an indicator that a language of the text data is not language neutral; selectively determining a language of the text data based on the set of reference scores comprises identifying a reference score having a minimum value, the language of the text data being a language associated with the reference score; and selectively determining a language of the text data based on the set of reference scores includes determining that multiple reference scores have a minimum value, and, in response, processing the text data through a classifier based on set of languages including languages associated with the multiple reference scores.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to language detection. More particularly, implementations of the present disclosure are directed to quick language detection with language neutral functionality. As described in further detail herein, implementations of the present disclosure include actions of receiving text data including a string of characters, processing the text data to determine a set of reference scores including two or more reference scores, each reference score being associated with a respective language, and being determined based on the text data and a dictionary document provided for the respective language, each dictionary document including a compression of a language document provided in the respective language, selectively determining a language of the text data based on the set of reference scores, and providing language data representative of the language as output.

As described herein, implementations of the present disclosure provide advantages over traditional techniques for language determination. For example, implementations of the present disclosure reduce the burden on computing resources (e.g., less computer processing power, smaller memory footprint) as compared to traditional techniques. In some implementations, and as described herein, such advantages are achieved, at least in part, based on using already compressed dictionary documents, and respective states. In this manner, recompression of sets of text documents to provide respective dictionary documents with each iteration of detecting a language is avoid. For example, a traditional technique can include appending the text data to the end of each text document (i.e., a text document for each language), and recompressing the entire text document with the text data appended thereto. Because implementations of the present disclosure avoid this (i.e., the text documents are compressed once) computing resources are conserved, and determination of the language is faster.

Figure 1:
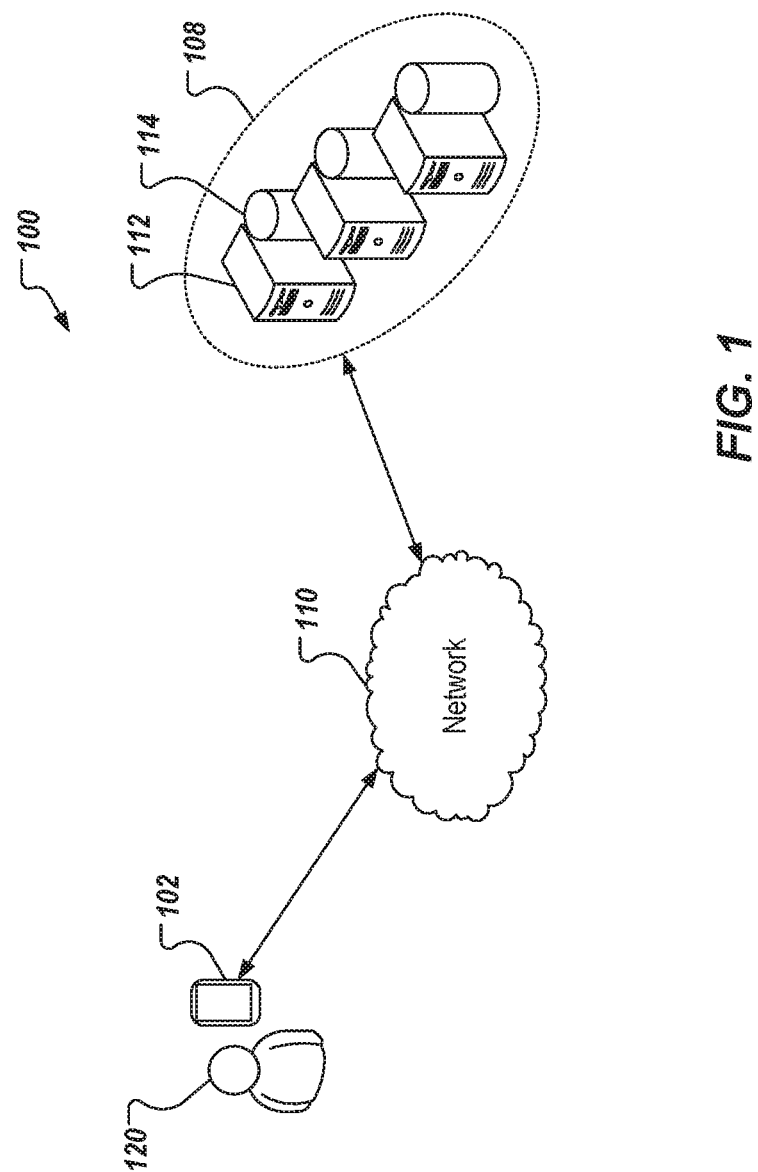
FIG. 1 depicts an example high-level architecture in accordance with implementations of the present disclosure.

FIG. 1 depicts an example high-level architecture 100 in accordance with implementations of the present disclosure. The example architecture 100 includes a device 102, a back-end system 108, and a network 110. In some examples, the network 110 includes a local area network (LAN), wide area network (WAN), the Internet, a cellular telephone network, a public switched telephone network (PSTN), a private branch exchange (PBX), or any appropriate combination thereof, and connects web sites, devices (e.g., the device 102), and back-end systems (e.g., the back-end system 108). In some examples, the network 110 can be accessed over a wired and/or a wireless communications link. For example, mobile devices, such as smartphones can utilize a cellular network to access the network 110.

In the depicted example, the back-end system 108 includes at least one server system 112, and data store 114 (e.g., database). In some examples, at least one server system 112 hosts one or more computer-implemented services that users can interact with using devices. For example, the server system 112 can host one or more AI-based digital agents (also referred to as a chatbots). In some examples, the server system 112 can host a language detection service in accordance with implementations of the present disclosure.

In some examples, the device 102 can each include any appropriate type of computing device such as a desktop computer, a laptop computer, a handheld computer, a tablet computer, a personal digital assistant (PDA), a cellular telephone, a network appliance, a camera, a smartphone, a telephone, a mobile phone, an enhanced general packet radio service (EGPRS) mobile phone, a media player, a navigation device, an email device, a game console, or an appropriate combination of any two or more of these devices, or other data processing devices.

In the depicted example, the device 102 is used by a user 120. In accordance with the present disclosure, the user 120 uses the device 102 to audibly interact with a chatbot. In some implementations, and as described in further detail herein, a language that the user speaks is determined by the language detection service of the present disclosure.

In some examples, the user 120 can include a customer of an enterprise that provides the AI-based digital agent, or on behalf of which the chatbot is provided. For example, the user 120 can include a customer that calls into a call center of the enterprise using the device 102, and is connected to the chatbot (e.g., hosted on the back-end system 108). In accordance with implementations of the present disclosure, and as described in further detail herein, the user 120 can provide input (e.g., text), and a language that the input is provided in can be determined by the language detection service of the present disclosure. In some examples, in response to detecting the language, the input can be provided to one of a plurality of chatbot systems. In some examples, each chatbot corresponds to a respective language, and the input can be provided to the chatbot that corresponds to the detected language.

Figure 2:
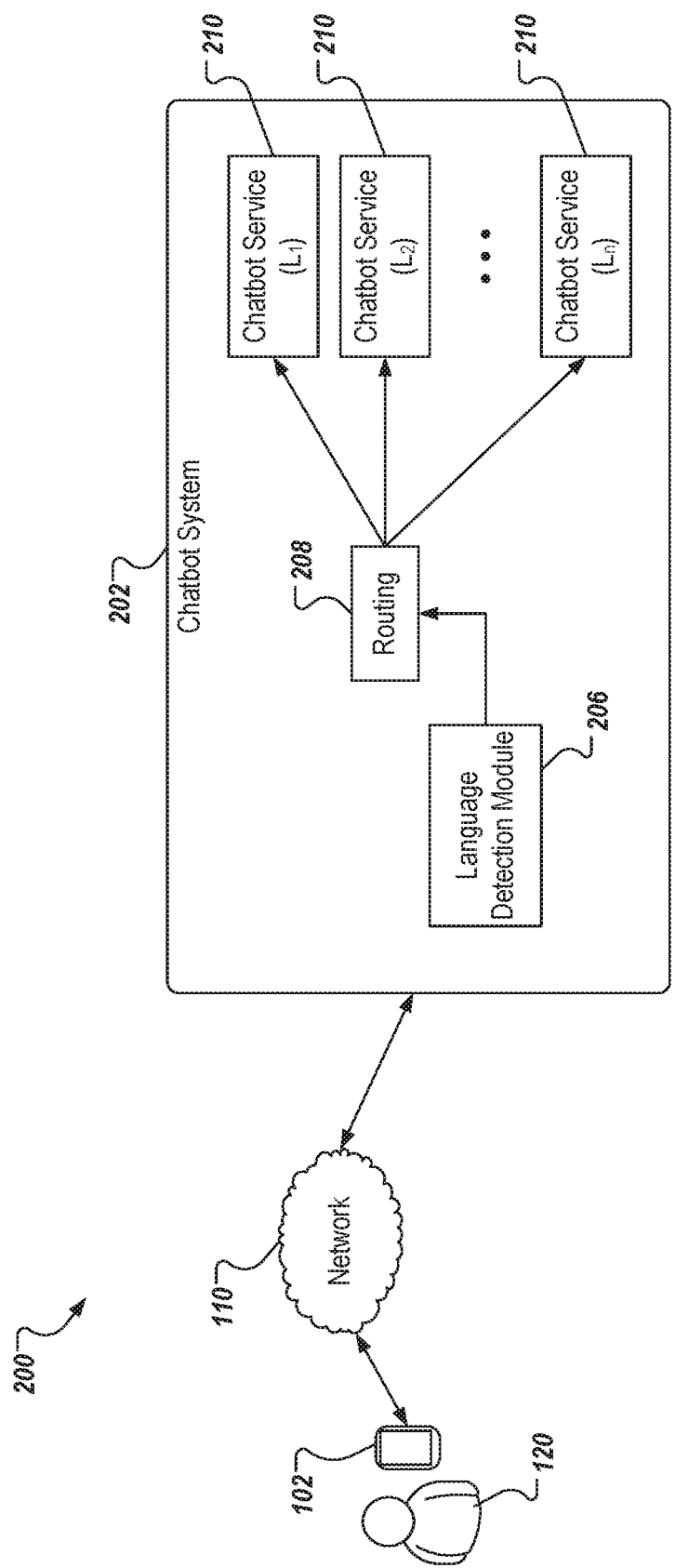
FIG. 2 depicts an example conceptual architecture in accordance with implementations of the present disclosure.

FIG. 2 depicts an example conceptual architecture 200 in accordance with implementations of the present disclosure. In some examples, components of the example conceptual architecture 200 can be hosted on one or more back-end systems (e.g., the back-end system 108 of FIG. 1). In the depicted example, the example conceptual architecture 200 includes a chatbot system 202 that includes a language detection module 206, a routing module 208, and a plurality of chatbot services 210. In some examples, each chatbot service 210 correspond to a language in a set of languages (e.g., L={L1, . . . , Ln}).

In some implementations, the language detection module 206 receives input (e.g., text data) from the user 120 through the computing device 102, and the network 110. For example, the user 120 can type into the computing device 102, which provides the text data in response, and transmits the text data to the chatbot system 202. In some examples, and as described in further detail herein, the language detection module 206 processes the text data in accordance with implementations of the present disclosure to determine a language that the text data is provided in. In some examples, the language detection module 206 provides language data, and the text data to the routing module 208. In some examples, the language data indicates a language that the text data is provided in.

In some implementations, the routing module 208 routes the text data to a particular chatbot service 210 based on the language data. For example, if the language data indicates that the text data is provided in English, the text data is routed to a chatbot service 210 that is specific to English. As another example, if the language data indicates that the text data is provided in French, the text data is routed to a chatbot service 210 that is specific to French. In this manner, the text data is routed to a chatbot service that is specific to, and optimized for the particular language that the text data is provided in.

In some implementations, and as described in further detail herein, the language detection module 206 determines a language of the text data based on a set of dictionary documents, each dictionary document including a respective state. In some examples, each dictionary document in the set of dictionary documents corresponds to a respective language. In some implementations, and as described in further detail herein, text data can be processed in view of the dictionary documents and the respective state to determine a set of reference scores. The language of the text data can be determined based on the set of reference scores.

Figures 3A, 3B:
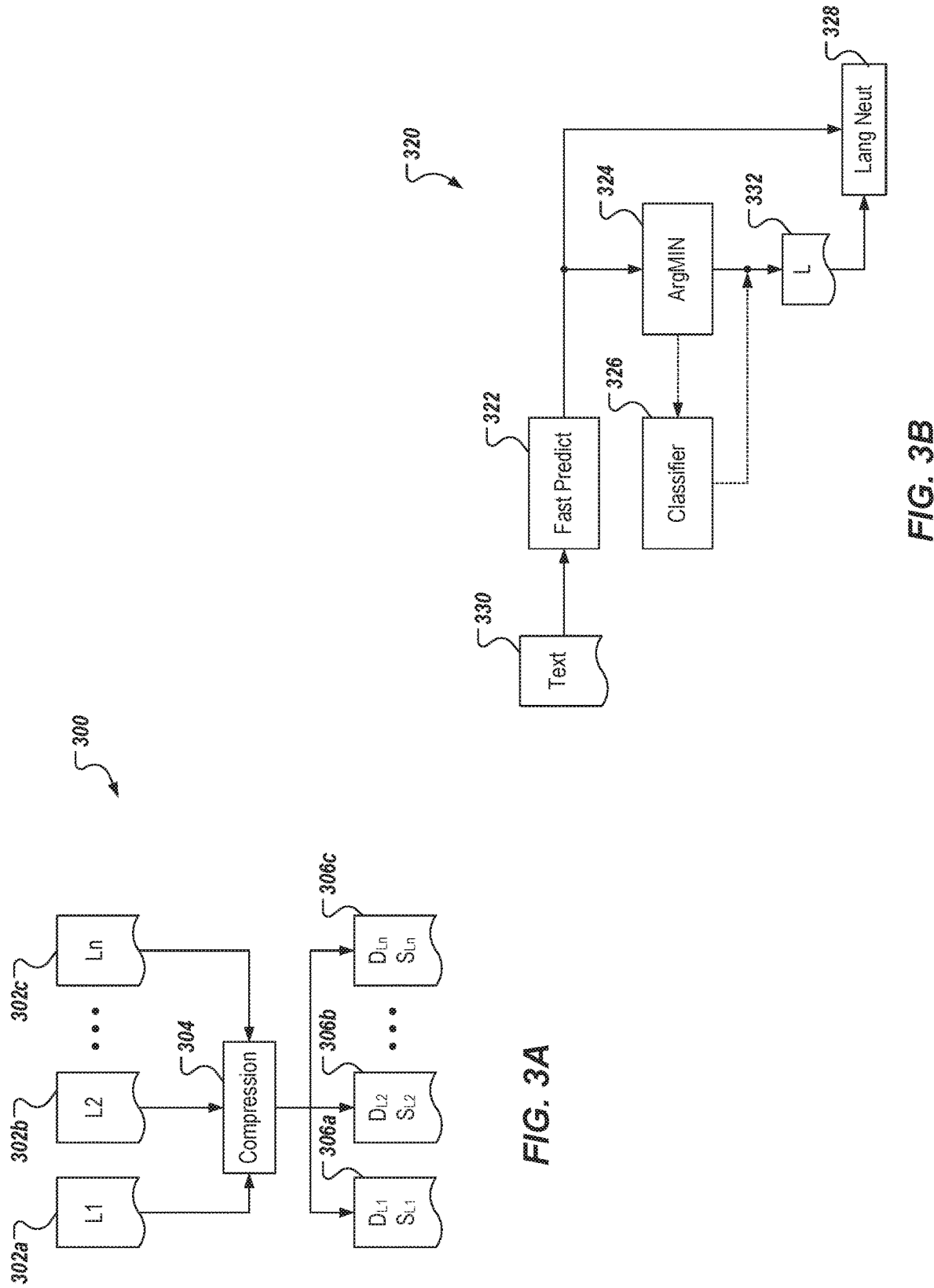
FIGS. 3A and 3B depict example diagrams in accordance with implementations of the present disclosure.

FIG. 3A depicts a conceptual compression system 300 in accordance with implementations of the present disclosure. In the depicted example, a plurality of text documents 302a, 302b, 302c are provided, each text document 302a, 302b, 302c corresponding to a respective language. A compression module 304 is provided, which compresses each of the text documents 302a, 302b, 302c to provide respective dictionary documents 306a, 306b, 306c.

In some implementations, each text document 302a, 302b, 302c is compressed using Lempel-Ziv compression to provide the respective dictionary documents 306a, 306b, 306c. In some implementations, each dictionary document 306a, 306b, 306c is associated with a respective state $S_{L1}$, $S_{L2}$, $S_{Ln}$, described in further detail herein.

Implementations of the present disclosure are described in further detail herein with reference to example compression of an example text document. The example text document is in English. It is contemplated, however, that implementations of the present disclosure can be realized with any appropriate compression, and text documents in any appropriate language.

An example text document can include a list of subtitles used in movies.

Frankly, my dear, I don't give a damn
I'm going to make him an offer he can't refuse
Here's looking at you, kid
. . .
Go ahead, make my day
Oh, dear!

In some examples, the subtitles can be concatenated to provide a single string of text. For example: Frankly, my dear, I don't give a damn I'm going to make him an offer he can't refuse Here's looking at you, kid . . . Go ahead, make my day, Oh, dear! In some examples, spaces, capital letters, and/or punctuation remarks (e.g., spaces, commas, quotation marks, parentheses, semi-colons, question marks, exclamation points) can be removed. For example, frankly my dear i don't give a damn I'm going to make him an offer he can't refuse here's looking at you kid . . . go ahead make my day oh dear.

In accordance with implementations of the present disclosure, the string of text is compressed to provide the dictionary document for the respective language. In some examples, compression includes going through each character of the string of text, and adding any new character, or new sequences of characters to the dictionary document. As introduced above, and in some implementations, Lempel-Ziv compression (also referred to as Lempel-Ziv-Welch (LZW) compression) can be used to provide the dictionary document. In some examples, the dictionary document begins with 256 characters (in the case of 8 bits), as an initial character set. For example, for Latin-based languages the dictionary document can include the letters a-to-z. In some examples, a language might include letters with accents (e.g., â, á, ç, é, ê, etc. in French). Consequently, the dictionary document can include the letters a-to-z, as well as letters having accents. In some examples, the dictionary document includes numbers (e.g., 0-9).

In some examples, the compression reads data of the string 8 bits at a time (e.g., character-by-character), and encodes the data as the number that represents its index in the dictionary. Each time a new sub-string of characters is encountered (e.g., fr), the new substring is added to the dictionary. Each time a sub-string that is already included in the dictionary is encountered, the next character in the string is concatenated to the sub-string to provide another sub-string that is reviewed for inclusion in the dictionary document. Using the example above, an example compression can begin with the f of frankly. Because the dictionary document already includes the letter f (from the initial character set), the character f is not added to the dictionary document. Because the f is not new (i.e., already in the dictionary document), compression continues with the next letter in the string. That is, fr is considered. Because the dictionary document does not include the sub-string fr, it is added to the dictionary document.

The compression will restart at the next letter, a in this example. Because the dictionary document already includes the letter a (from the initial character set), the character a is not added to the dictionary document. Because the a is not new (i.e., already in the dictionary document), compression continues with the next letter in the string. That is, an is considered. Because the dictionary document does not include the sub-string an, it is added to the dictionary document. Consequently, and to this point, the dictionary document includes, for example, D=[a . . . f . . . fr . . . an]. This process continues, and as new sub-strings are encountered, the new sub-strings are added to the dictionary document. For example, if the word frank, frankly, or france are encountered, the sub-string fra will be added to the dictionary document.

In some implementations, and as introduced above, each dictionary document each dictionary document 306a, 306b, 306c is associated with a respective state $S_{L1}$, $S_{L2}$, $S_{Ln}$. In some examples, each state provides the last sub-string of characters that was used in the compression process to provide the respective dictionary document. For example, if the last word in the string of text is computer, the compression can process the work, as described above, and for example, determine that the sub-string comp is not included in the dictionary document. Consequently, the sub-string comp can be added to the dictionary document. The process can continue until the sub-string uter is considered, and it is determined that the sub-string is already included in the dictionary. Accordingly, the state (S) can be set to uter (e.g., the last sub-string considered). In some implementations, and as described in further detail herein, determining the language of the text data is at least partly based on the states of each dictionary document.

FIG. 3B depicts a conceptual language detection system 320 in accordance with implementations of the present disclosure. In some examples, the language detection module 206 of FIG. 2 includes at least a portion of the language detection system 320 of FIG. 3B. In the depicted example, the language detection system 320 includes a fast predict module 322, an argument module 324, a classifier module 326, and a language neutral module 328. In some examples, and as described herein, text data 330 is provided to the language detection system 320, and language data 332 is provided. The language data 332 indicates a language that the text data 330 is provided in.

In some implementations, the fast predict module 322 processes the text data 330 based on each of the dictionary documents, and their respective states. That is, the fast predict module 322 processes the text data 330 based on the already compressed text documents (text documents of different languages), each recorded in a respective dictionary document. In some implementations, the text data 330 is processed to determine a reference score for each dictionary document. In some examples, the reference score indicates a number of additions to a respective dictionary document that would be required to add the text data to the dictionary document.

In further detail, and by way of non-limiting example, the text data 330 can include the string [my name is william]. In some implementations, the text data 330 is compared to a dictionary document of a particular language, beginning with the state of the dictionary document. For example, the text data 330 can be compared to a first dictionary document for English, with the example state above, uter. Beginning with uter, the text data [my name is william] can be processed to determine a number of uses from the dictionary document that already exist in order to describe the sentence fully. For example, and with respect to the example text data [my name is william] (with length 18 characters including spaces), it can be determined that the text data already exists in full in the dictionary document. Consequently, and example score can be provided as 1/18 (e.g., the number of uses within the dictionary document divided by the length of the sub-string). Because, in this example, the text data is in English, and the first dictionary document is also in English, the number of uses, and thus the reference score is relatively low (e.g., 1/18=0.056). In some examples, a score of 0 is never possible, as at least one entry in the dictionary document is always necessary in order to describe the sequence, and this is what is counted.

As another example, the text data 330 can be compared to a second dictionary document for French, with an example state of [voir]. Beginning with [voir], the text data [my name is william] can be processed to determine a number of uses to the second dictionary document that would be required to add sub-strings of the text data to the second dictionary document using the compression process described herein. Because, in this example, the text data is in English, and the second dictionary document is in French, the number of additions, and thus the reference score can be higher (e.g., 5/18=0.28). Consequently, a second reference score for the text data, and the second dictionary document can be provided as 0.28.

In some implementations, this process is performed for all dictionary documents. In this manner, reference scores are provided for each language covered in the set of dictionary documents. For example, if fifty dictionary documents are provided, fifty languages are covered across the set of fifty dictionary documents. Consequently, fifty reference scores would be provided as output of the fast predict module 322.

In some implementations, the set of reference scores are provided to the argument module 324. In some examples, the argument module 324 determines the minimum reference score in the set of reference scores. The language corresponding to the minimum reference score is determined to be the language of the text data 330, and is output as the language data 332. In the examples above, it can be determined that the first reference score is the minimum reference score. Consequently, English is output as the language data 332.

In some implementations, it can occur that multiple reference scores are determined to be the minimum (e.g., there is a tie between scores). That is, multiple references scores, although based on different languages, can have the same value, and that value can be determined to be the minimum. In some examples, if multiple reference scores have the minimum value, the text data 330, and the languages represented in the tie are provided to the classifier module 326. In some examples, the classifier module 326 classifies the text data 330 into one of the languages (i.e., the languages of the tie). For example, if the output of the argument module 324 indicates a tie between English, and French, the text data 330, is provided to the classifier module 326, as well as instructions for the classifier module 326 to only consider English and French, and no other languages.

In some examples, the classifier executed by the classifier module 326 is provided as a naive Bayes classifier. A naive Bayes classifier can be described as a conditional probability model. For example, given a problem instance to be classified (e.g., a language of text data), represented by a vector x=($x_1$, . . . , $x_n$) representing some n features (independent variables), the probability model assigns to this instance probabilities p($C_k$|x). That is, the classifier provides a probability for each language, each probability indicating a likelihood that the text data 330 is of the respective language. It is contemplated, however, that any appropriate classifier can be used. In some examples, the language associated with the highest probability is selected as the language, and is output as the language data 332.

In some implementations, the language neutral module 328 can indicate whether the text data 330 is language-neutral based on the reference scores provided from the fast prediction module 322. Even though a language may be determined, and provided as the language data 332, the language neutral module 328 can either pass on the prediction, or override the prediction, and instead provide an indication that the text data 330 is language-neutral. This can occur for example, in cases where the text data 330 is language-agnostic (e.g., email addresses, telephone numbers, uniform resource locators (URLs), credit card numbers, IP addresses), where the text data 330 is the same in a plurality of languages. In some implementations, the language neutral module 328 is triggered in response to occurrence of one or more conditions. Example conditions can include, without limitation, all reference scores exceeding a threshold value, X (e.g., 3) or more reference scores being the same minimum value (e.g., tie of 3 reference scores), and a ratio of minimum score to maximum score being greater than a threshold value.

In some implementations, the language neutral module 328 processes the reference scores through one or more machine-learning (ML) technique, which can develop rules to determine whether the language is irrelevant (e.g., the text data 300 is agnostic to a particular language). An example ML technique includes, without limitation, a random forest. In some examples, the random forest can be trained a datasets of language-neutral examples, and non-neutral examples, and provides a binary prediction based on the reference scores. For example, the text data 330 is either non-neutral, and the detected language (i.e., provided as the language data 332) is used, or the text data 330 is language-neutral, and language data indicating neutral is returned. In some examples, the input to the language neutral module 328 are only the reference scores from all of the compressions, and the length of the string (i.e., the number of characters in the text data 330), but not the string itself. In some examples, if the language neutral module 328 does not flag the text data 330 as language-neutral, then language detection proceeds as described herein (e.g., through the argument module 324, and, if needed, the classifier module 326).

In some implementations, and referring again to FIG. 2, the language detection module 206 performs the language detection processes, as described herein. In some examples, if the language is non-neutral, the language detection module 206 provides the language data to the routing module 208. The routing module 208 routes the text data to a corresponding chatbot service 210.

Figure 4:
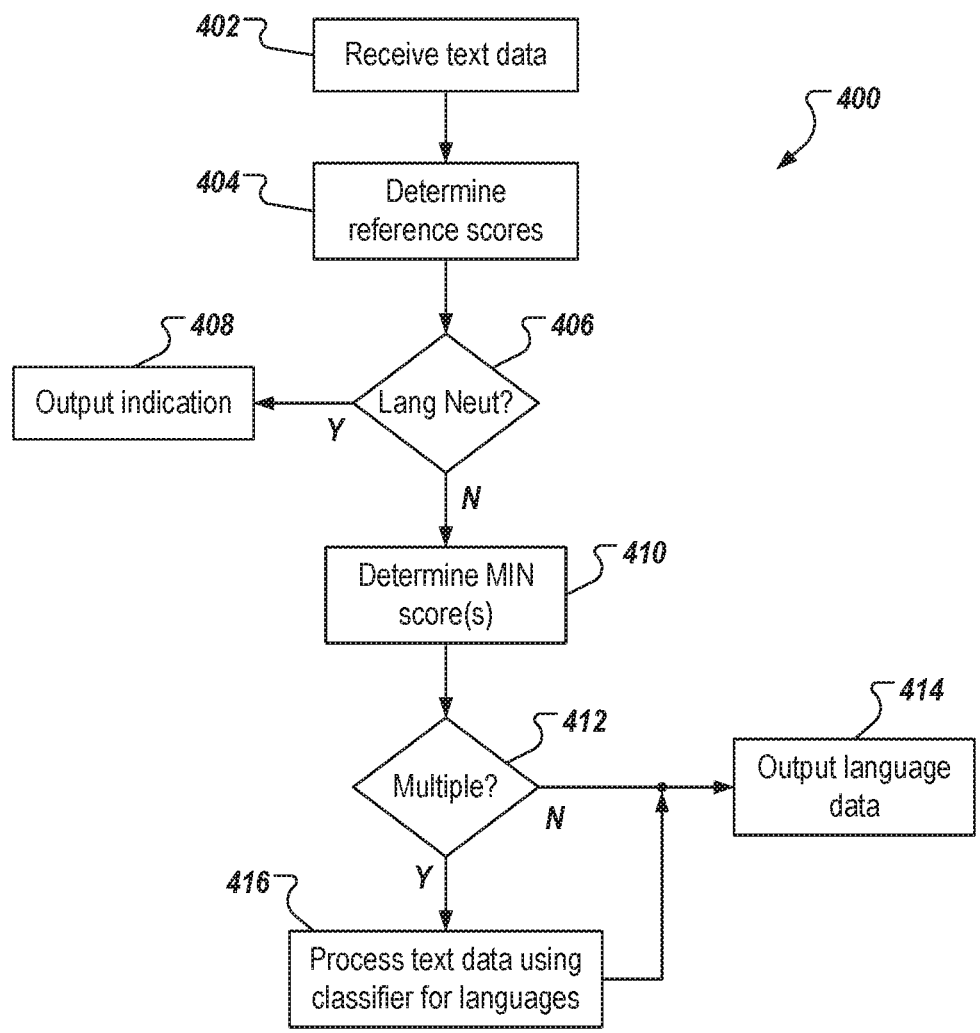
FIG. 4 depicts an example process that can be executed in accordance with implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1).

Text data is received (402). For example, chatbot system 202 receives the text data 330 from the device 102 over the network 110, and text data 330 is provided to the fast predict module 322. Reference scores are determined (404). For example, and as described herein, the fast predict module 322 processes the text data in view of each of the dictionary documents, and their respective states to provide a set of reference scores. In some examples, each reference score corresponds to a language of a respective dictionary document. In some examples, each reference score represents a number of additions to the dictionary document that would be required to add the text data to the dictionary document based on a state of the dictionary document.

It is determined whether the text data is language-neutral (406). For example, and as described herein, the set of reference scores is processed by the unknown language module 328 to determine whether the text data is language neutral. In some examples, the set of reference scores, and a length of the text data are processed using a ML technique that selectively outputs an indicator that the text data is not language neutral. If the text data is language neutral, an indication is output (408). For example, language data indicating that the text data is language neutral is output. In some examples, determining whether the text data is language is language neutral is only executed in certain conditions (e.g., all reference scores exceeding a threshold value, X or more reference scores being the same minimum value, and a ratio of minimum score to maximum score being greater than a threshold value).

If the text data is not language neutral, one or more minimum reference scores are determined (410). It is determined whether multiple reference scores are the minimum (412). For example, and as described herein, a single reference score can have a minimum value, or multiple reference scores can have the minimum value (e.g., tie between reference scores). If multiple reference scores are not the minimum, language data is output (414). That is, the language associated with the reference score having the minimum value is output as the language data. If multiple reference scores are the minimum, the text data is processed through a classifier (416), and language data is output (414). For example, and as described herein, the text data is processed through a classifier based on set of languages including languages associated with the multiple reference scores, and a probability value is determined for each language. The language with the highest probability is selected, and is output as the language data.

Implementations of the present disclosure provide improvements over traditional solutions for language detection. For example, implementations of the present disclosure reduce response times, and the burden on computing resources (e.g., processors, memory). In some examples, traditional techniques can include compressing language documents to provide document dictionaries each time a language is to be detected. In contrast, implementations of the present disclosure, leverage already compressed language documents, provided as the dictionary documents described herein), avoiding multiple compression executions for each language detection.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for detecting language based on text data, the method being executed by one or more processors and comprising:

receiving, by the one or more processors, text data comprising a string of characters;

processing, by the one or more processors, the text data to determine a set of reference scores comprising two or more reference scores, each reference score being associated with a respective language, and being determined based on the text data and a dictionary document provided for the respective language, each dictionary document comprising a compression of a language document provided in the respective language, wherein processing the text data to determine the set of reference scores comprises, for each dictionary document, determining a number of additions to the dictionary document that would be required to add the text data to the dictionary document based on a state of the dictionary document;

selectively determining, by the one or more processors, a language of the text data based on the set of reference scores; and providing, by the one or more processors, language data representative of the language as output.

2. The method of claim 1, wherein each dictionary document is provided based on a compression algorithm, and the state represents a sub-string of characters last processed in the compression algorithm.

3. The method of claim 1, wherein selectively determining the language of the text data based on the set of reference scores comprises determining that the text data is not language neutral, and, in response, processing the reference scores to identify the language.

4. The method of claim 3, wherein determining that the text data is not language neutral comprises processing the set of reference scores and a length of the text data using a machine-learning (ML) technique that outputs an indicator that the text data is not language neutral.

5. The method of claim 1, wherein selectively determining a language of the text data based on the set of reference scores comprises identifying a reference score having a minimum value, the language of the text data being a language associated with the reference score having the minimum value.

6. The method of claim 1, wherein selectively determining a language of the text data based on the set of reference scores comprises determining that multiple reference scores have a minimum value, and, in response, processing the text data through a classifier based on set of languages comprising languages associated with the multiple reference scores.

7. One or more non-transitory computer-readable storage media coupled to one or more processors and having instructions stored thereon which, when executed by the one or more processors, cause the one or more processors to perform operations for detecting language based on text data, the operations comprising:

receiving text data comprising a string of characters;

processing the text data to determine a set of reference scores comprising two or more reference scores, each reference score being associated with a respective language, and being determined based on the text data and a dictionary document provided for the respective language, each dictionary document comprising a compression of a language document provided in the respective language, wherein processing the text data to determine the set of reference scores comprises, for each dictionary document, determining a number of additions to the dictionary document that would be required to add the text data to the dictionary document based on a state of the dictionary document;

selectively determining a language of the text data based on the set of reference scores; and providing language data representative of the language as output.

8. The computer-readable storage media of claim 7, wherein each dictionary document is provided based on a compression algorithm, and the state represents a sub-string of characters last processed in the compression algorithm.

9. The computer-readable storage media of claim 7, wherein selectively determining the language of the text data based on the set of reference scores comprises determining that the text data is not language neutral, and, in response, processing the reference scores to identify the language.

10. The computer-readable storage media of claim 9, wherein determining that the text data is not language neutral comprises processing the set of reference scores and a length of the text data using a machine-learning (ML) technique that outputs an indicator that the text data is not language neutral.

11. The computer-readable storage media of claim 7, wherein selectively determining a language of the text data based on the set of reference scores comprises identifying a reference score having a minimum value, the language of the text data being a language associated with the reference score having the minimum value.

12. The computer-readable storage media of claim 7, wherein selectively determining a language of the text data based on the set of reference scores comprises determining that multiple reference scores have a minimum value, and, in response, processing the text data through a classifier based on set of languages comprising languages associated with the multiple reference scores.

13. A system, comprising:
one or more processors; and
a computer-readable storage device coupled to the one or more processors and having instructions stored thereon which, when executed by the one or more processors, cause the one or more processors to perform operations for detecting language based on text data, the operations comprising:

receiving text data comprising a string of characters;

processing the text data to determine a set of reference scores comprising two or more reference scores, each reference score being associated with a respective language, and being determined based on the text data and a dictionary document provided for the respective language, each dictionary document comprising a compression of a language document provided in the respective language, wherein processing the text data to determine the set of reference scores comprises, for each dictionary document, determining a number of additions to the dictionary document that would be required to add the text data to the dictionary document based on a state of the dictionary document;

selectively determining a language of the text data based on the set of reference scores; and providing language data representative of the language as output.

14. The system of claim 13, wherein each dictionary document is provided based on a compression algorithm, and the state represents a sub-string of characters last processed in the compression algorithm.

15. The system of claim 13, wherein selectively determining the language of the text data based on the set of reference scores comprises determining that the text data is not language neutral, and, in response, processing the reference scores to identify the language.

16. The system of claim 15, wherein determining that the text data is not language neutral comprises processing the set of reference scores and a length of the text data using a machine-learning (ML) technique that outputs an indicator that the text data is not language neutral.

17. The system of claim 13, wherein selectively determining a language of the text data based on the set of reference scores comprises identifying a reference score having a minimum value, the language of the text data being a language associated with the reference score having the minimum value.

* * * * *